(12) United States Patent
Kwon et al.

(10) Patent No.: US 11,312,276 B2
(45) Date of Patent: Apr. 26, 2022

(54) VEHICLE DOOR ARMREST

(71) Applicants: HYUNDAI MOTOR COMPANY, Seoul (KR); KIA MOTORS CORPORATION, Seoul (KR); KAIS Inc., Pyeongtaek-si (KR)

(72) Inventors: Ho Kyeong Kwon, Gyeonggi-do (KR); Wan Su Park, Gwacheon-si (KR); Jae Ho Sin, Yongin-si (KR)

(73) Assignees: HYUNDAI MOTOR COMPANY, Seoul (KR); KIA MOTORS CORPORATION, Seoul (KR); KAIS Inc., Pyeongtaek-si (KR)

( * ) Notice: Subject to any disclaimer, the term of this patent is extended or adjusted under 35 U.S.C. 154(b) by 71 days.

(21) Appl. No.: 16/789,755

(22) Filed: Feb. 13, 2020

(65) Prior Publication Data
US 2021/0107386 A1    Apr. 15, 2021

(30) Foreign Application Priority Data

Oct. 11, 2019  (KR) .................. 10-2019-0125791

(51) Int. Cl.
*B60N 2/75*  (2018.01)
*B60R 13/02*  (2006.01)

(52) U.S. Cl.
CPC ............ *B60N 2/78* (2018.02); *B60R 13/0243* (2013.01)

(58) Field of Classification Search
CPC .............................. B60N 2/78; B60R 13/0243
See application file for complete search history.

(56) References Cited

U.S. PATENT DOCUMENTS

| 2018/0079337 A1* | 3/2018 | Whitlock | B60N 2/4235 |
| 2018/0208089 A1* | 7/2018 | Harris | B60N 2/767 |

FOREIGN PATENT DOCUMENTS

JP        2001-213212 A    8/2001

\* cited by examiner

*Primary Examiner* — D Glenn Dayoan
*Assistant Examiner* — Melissa Ann Bonifazi
(74) *Attorney, Agent, or Firm* — Lempia Summerfield Katz LLC

(57) ABSTRACT

A vehicle door armrest includes: a cushion; a skin covering the cushion; and a living hinge connecting the cushion and the skin. In particular, the skin is integrally connected to the cushion through the living hinge so that the skin, the cushion, and the living hinge form a unitary one-piece structure.

10 Claims, 7 Drawing Sheets

VEHICLE DOOR ARMREST

CROSS-REFERENCE TO RELATED APPLICATION

This application claims priority to and the benefit of Korean Patent Application No. 10-2019-0125791, filed on Oct. 11, 2019, the entire contents of which are incorporated herein by reference.

FIELD

The present disclosure relates to a vehicle door armrest, and more particularly, to a vehicle door armrest having a skin covering a cushion.

BACKGROUND

The statements in this section merely provide background information related to the present disclosure and may not constitute prior art.

A vehicle door is provided with a door armrest by which an arm of an occupant is supported. The door armrest is designed to have stiffness enough to withstand a load applied by the occupant's arm.

For example, the door armrest according to the related art includes a core made of hard resin, and a skin covering the core. The skin is made of soft elastic resin, and a plurality of protrusions and a plurality of spaces are provided between the core and the skin so that the door armrest has an elastic feel (cushion feel). However, the plurality of protrusions and the plurality of spaces fail to provide sufficient elastic feel (cushion feel) and soft feel.

As another example, the door armrest according to the related art includes a core formed by injection molding, an elastic foam pad made of polyurethane or the like, and a flexible leather skin covering the elastic foam pad. After the elastic foam pad is mounted to the core, the leather skin is bonded to an outer surface of the elastic foam pad. Thus, the door armrest may have sufficient soft feel and elastic feel by the leather skin and the elastic foam pad. However, the manufacturing cost increases due to complex operations such as the injection molding of the elastic foam pad and the bonding of the leather skin.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle door armrest with a skin covering a cushion and integrally connected to the cushion through a living hinge, thereby simplifying assembly and reducing manufacturing cost.

According to an aspect of the present disclosure, a vehicle door armrest may include: a cushion; a skin covering the cushion; and a living hinge connecting the cushion and the skin, wherein the skin may be integrally connected to the cushion through the living hinge so that the skin, the cushion, and the living hinge may form a unitary one-piece structure.

In one form, the cushion may have a plurality of ridge portions and a plurality of valley portions which are continuously formed.

In another form, the skin may include a cover portion covering a top of the cushion, and edge walls covering edges of the cushion.

In other form, the edge walls may include a first edge wall facing an interior space of a vehicle, and a second edge wall facing an exterior space of the vehicle.

In still other form, the cushion may have a plurality of first mounting projections extending toward an exterior space of a vehicle, and the skin may have a plurality of second mounting projections extending toward the exterior space of the vehicle. As the skin is folded over the cushion to overlap each other, second mounting projections of the plurality of second mounting projections may be aligned with and overlap corresponding first mounting projections among the plurality of first mounting projections.

In another aspect of the present disclosure, the cushion may have first pores formed therein. The first pores may be closed pores.

In another form, the skin may have second pores formed therein. The second pores may be closed pores.

In other form, the cushion has a plurality of ridge portions and a plurality of valley portions, which are continuously connected to each other to form a wave form and configured to primarily absorb a load applied on the vehicle door armrest, and a plurality of pores formed in the plurality of ridge portions is configured to secondarily absorb the load applied on the vehicle door armrest.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
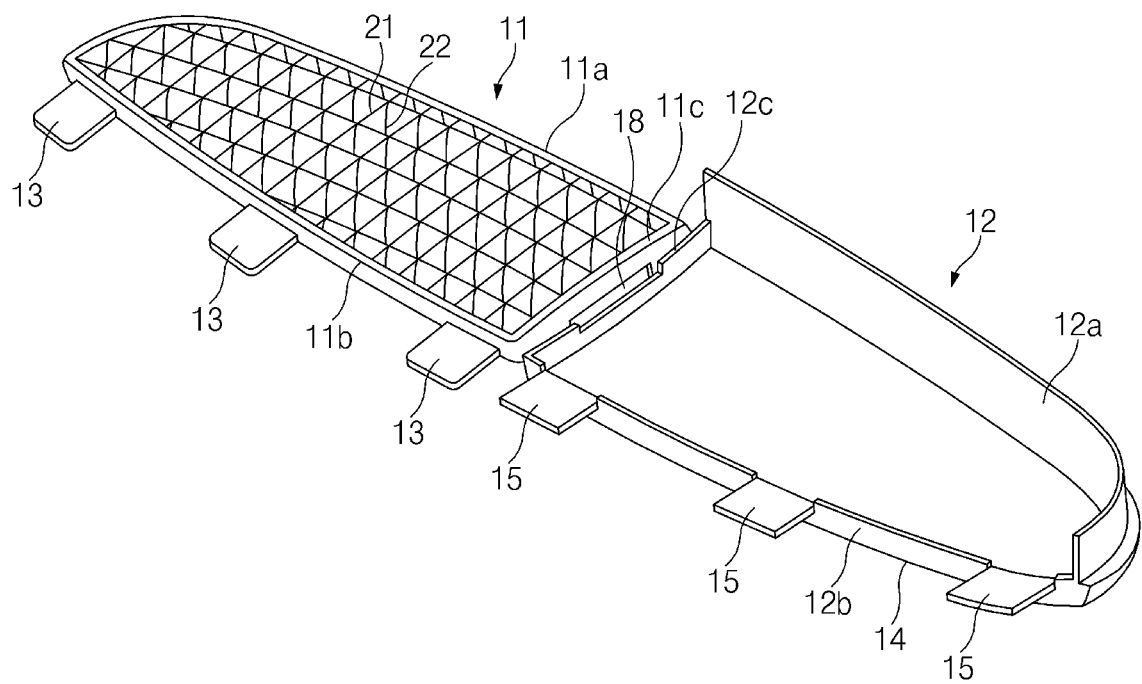
FIG. 1 illustrates a perspective view of a vehicle door armrest according to an exemplary form of the present disclosure in which a cushion and a skin are unfolded through a living hinge.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
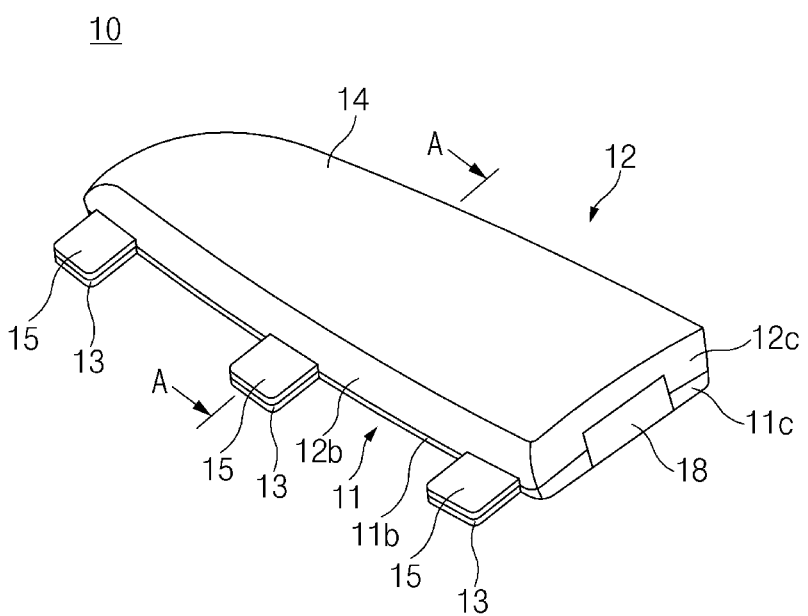
FIG. 2 illustrates a perspective view of a vehicle door armrest according to an exemplary form of the present disclosure in which a skin is folded over a cushion through a living hinge.

Referring to FIGS. 1 and 2, a vehicle door armrest 10 according to an exemplary form of the present disclosure may include a cushion 11 and a skin 12 covering the cushion 11.

The cushion 11 may support a load applied by an arm of an occupant. In particular, the cushion 11 may have an elastic feel.

Figure 3:
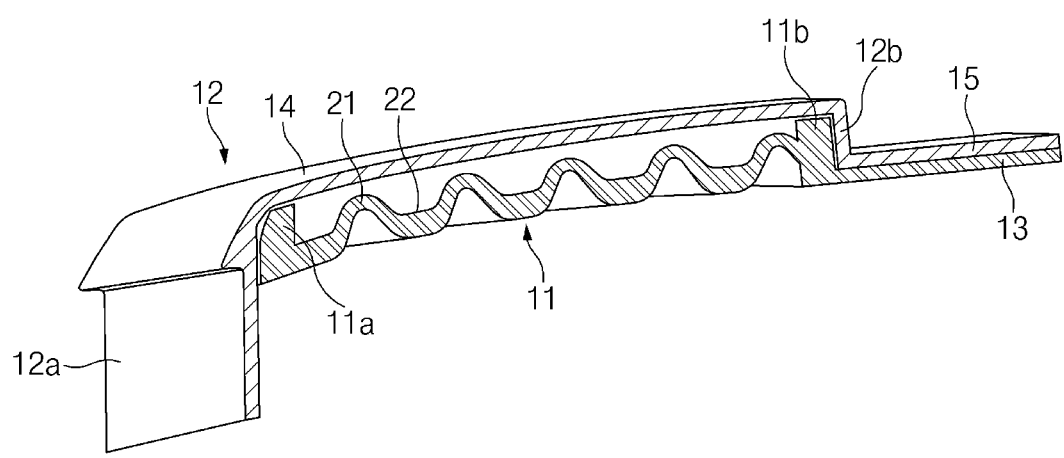
FIG. 3 illustrates a cross-sectional view taken along line A-A in FIG. 2.
Figure 4:
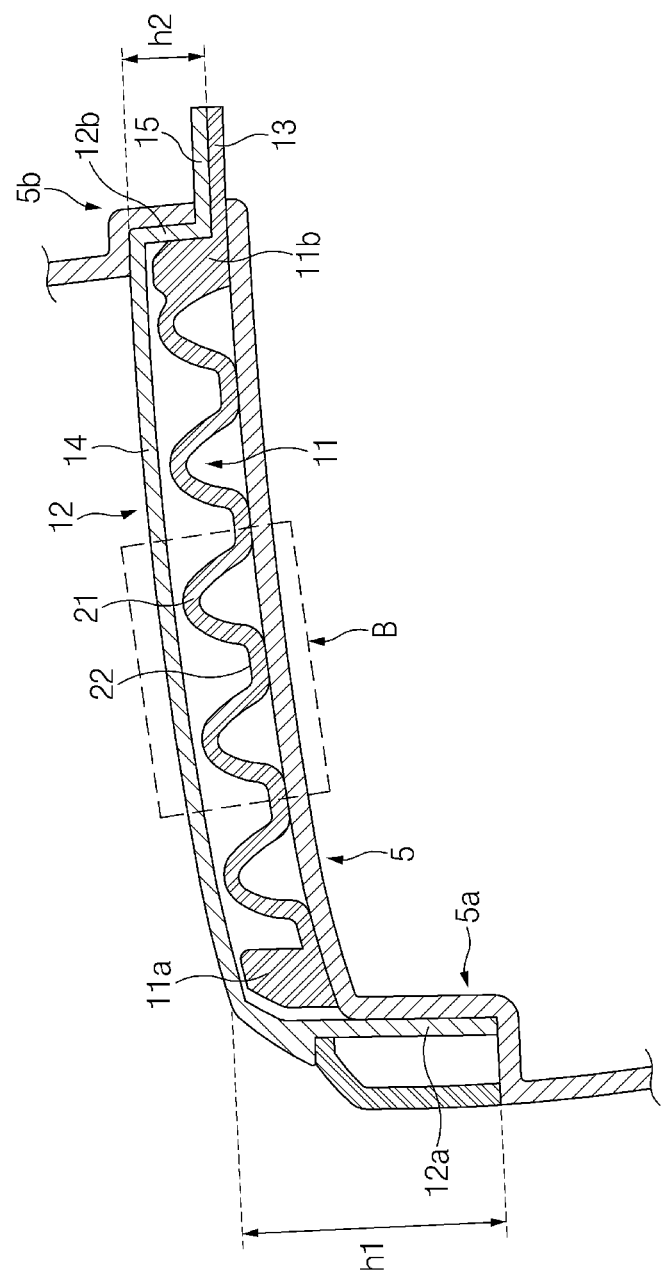
FIG. 4 illustrates a cross-sectional view of a structure in which a vehicle door armrest according to an exemplary form of the present disclosure is mounted to a door trim.
Figure 5:
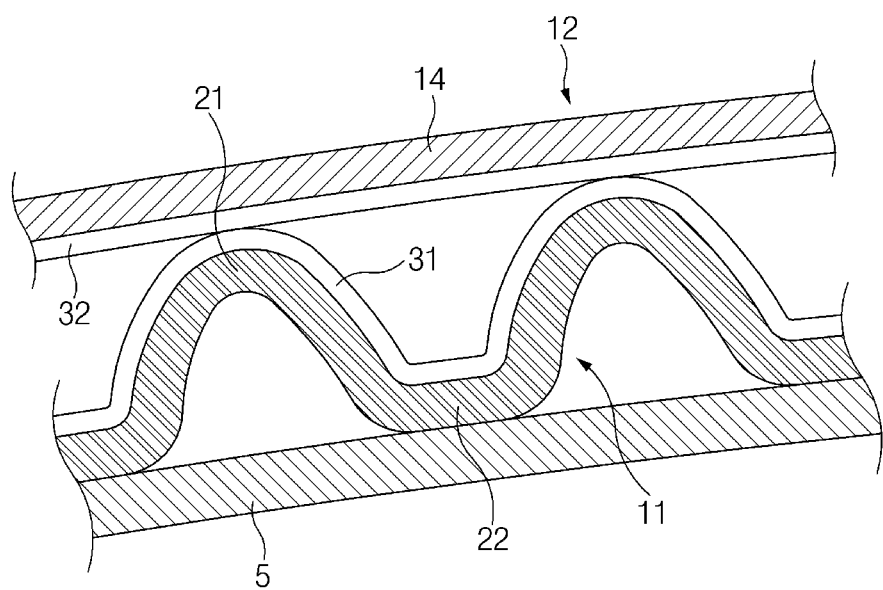
FIG. 5 illustrates an enlarged view of portion B indicated by arrow B in FIG. 4.

For example, as illustrated in FIG. 1, the cushion 11 may include: a plurality of edges 11a, 11b, and 11c, and a plurality of ridge portions 21 and a plurality of valley portions 22 arranged among the plurality of edges 11a, 11b, and 11c. The plurality of ridge portions 21 and the plurality of valley portions 22 may be continuously connected to each other to form a wave form as illustrated in FIGS. 3 to 5. The plurality of ridge portions 21 and the plurality of valley portions 22 may be configured to primarily absorb a load applied on the vehicle door armrest 10. The ridge portions 21 and the valley portions 22 may be arranged to alternate each other, and each of the ridge portions 21 may be formed in an arch shape. The plurality of edges 11a, 11b, and 11c may include a first edge 11a, a second edge 11b, and a third edge 11c.

Referring to FIG. 4, the first edge 11a may face an inboard sidewall 5a of a door trim 5, and the second edge 11b may face an outboard sidewall 5b of the door trim 5. Referring to FIG. 1, when the skin 12 is unfolded with respect to the cushion 11, the third edge 11c of the cushion 11 may be adjacent to the skin 12. For example, a height of each of the edges 11a, 11b, and 11c may be greater than a height of each ridge portion 21. As another example, the height of each of the edges 11a, 11b, and 11c may be less than the height of each ridge portion 21. As another example, the height of each of the edges 11a, 11b, and 11c may be the same as the height of each ridge portion 21.

In addition, the cushion 11 may have a plurality of first mounting projections 13 extending from the second edge 11b toward an exterior space of the vehicle.

The skin 12 may include a cover portion 14 covering the top of the cushion 11, and a plurality of edge walls 12a, 12b, and 12c covering the edges 11a, 11b, and 11c of the cushion 11.

The plurality of edge walls 12a, 12b, and 12c may include a first edge wall 12a covering the first edge 11a of the cushion 11, a second edge wall 12b covering the second edge 11b of the cushion 11, and a third edge wall 12c covering the third edge 11c of the cushion 11. For example, as illustrated in FIG. 4, a height h1 of the first edge wall 12a may be greater than a height h2 of the second edge wall 12b. As another example, the height h1 of the first edge wall 12a may be less than or the same as the height h2 of the second edge wall 12b. In other words, the height h1 of the first edge wall 12a and the height h2 of the second edge wall 12b may be varied. Referring to FIG. 4, the first edge wall 12a may be attached to the inboard sidewall 5a of the door trim 5, and the second edge wall 12b may be attached to the outboard sidewall 5b of the door trim 5. The inboard sidewall 5a of the door trim 5 refers to a wall facing an interior space of the vehicle, and the outboard sidewall 5b of the door trim 5 refers to a wall facing the exterior space of the vehicle. Thus, the first edge 11a of the cushion 11 and the first edge wall 12a of the skin 12 may face the interior space of the vehicle, and the first edge 11a of the cushion 11 and the second edge wall 12b of the skin 12 may face the exterior space of the vehicle.

The skin 12 may have a plurality of second mounting projections 15 extending from the second edge wall 12b toward the exterior space of the vehicle. As the skin 12 is folded over the cushion 11, the second mounting projections 15 may be aligned with and overlap the corresponding first mounting projections 13. The first and second mounting projections 13 and 15 may be fitted into grooves of the door trim 5, so that the assembly of the door armrest 10 may be significantly simplified.

A living hinge 18 may pivotally connect the cushion 11 and the skin 12, so that the skin 12 may be folded to the cushion 11 or be unfolded from the cushion 11 through the living hinge 18. As the skin 12 is folded over the cushion 11 by the living hinge 18 to overlap each other, the skin 12 may cover the entirety of the cushion 11. The skin 12 may be integrally connected to the cushion 11 through the living hinge 18. The cushion 11 and the skin 12 may be made of the same resin material, and the living hinge 18 may be a thin flexible hinge made of the same material as that of the skin 12 and the cushion 11. According to an exemplary form, the cushion 11, the skin 12, and the living hinge 18 may be made of the same resin material such as polyvinyl chloride (PVC). In particular, the cushion 11, the skin 12, and the living hinge 18 may be formed as a unitary one-piece structure by foam injection molding or the like.

Referring to FIGS. 2 and 3, the skin 12 may be folded to the cushion 11 through the living hinge 18 so that the skin 12 may cover the top and the edges 11a, 11b, and 11c of the cushion 11. Since the cushion 11 and the skin 12 are formed as the unitary one-piece structure through the living hinge 18, the number of components may be reduced and the assembly process may be significantly simplified, and thus the manufacturing cost may be reduced, compared to the related art.

Figure 6:
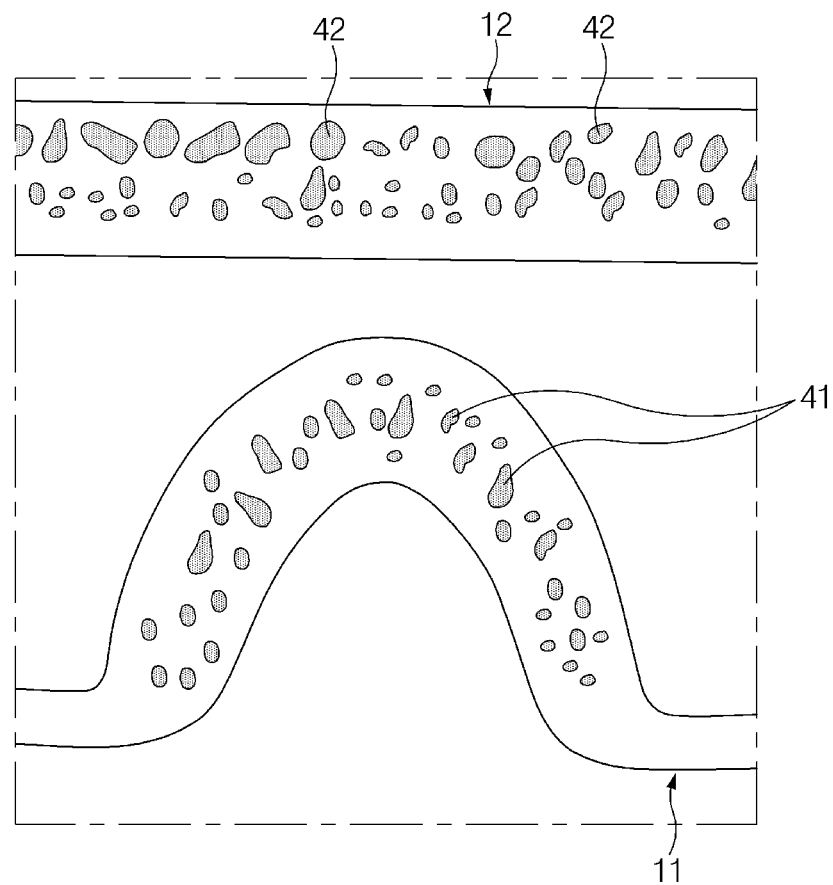
FIG. 6 illustrates a plurality of first pores and a plurality of second pores formed in a cushion and a skin of a vehicle door armrest according to an exemplary form of the present disclosure.

According to an exemplary form, when the cushion 11, the skin 12, and the living hinge 18 are formed as the unitary one-piece structure by foam injection molding, first pores 41 may be formed in the cushion 11, and second pores 42 may be formed in the skin 12, as illustrated in FIG. 6. That is, the cushion 11 may have the first pores 41 formed therein, and the skin 12 may have the second pores 42 formed therein. For example, the first pores 41 may be formed in the plurality of ridge portions 21 and/or the plurality of valley portions 22. The first pores 41 and/or the second pores 42 may be configured to secondarily absorb the load applied on the vehicle door armrest 10.

According to an exemplary form, the first pores 41 and the second pores 42 may be closed pores. That is, the cushion 11 and the skin 12 may have a porous foam layer in which the closed pores are formed.

As described above, the cushion 11 may provide a primary cushioning function using the plurality of ridge portions 21 and the plurality of valley portions 22 which are continuously formed, and may provide a secondary cushioning function using the first pores 41 and/or the second pores 42. In detail, when a load is applied to the door armrest 10, the arch-shaped ridge portions 21 may primarily absorb energy, and the first pores 41 may be pressed to secondarily absorb energy. Thus, the cushion 11 may provide a cushion feel equal to or greater than that of a cushion according to the related art.

In addition, as the cushion 11 and the skin 12 are made of the same resin material such as PVC, they may provide soft feel.

According to an exemplary form, as an expansion ratio is varied during foam injection molding, the thicknesses, shapes, and the like of the cushion 11 and the skin 12 may be adjusted, and thus the elastic feel, soft feel, and the like of the cushion 11 and the skin 12 may be tuned.

According to another exemplary form, the thickness of the cushion 11 may be adjusted by core-back molding. For example, as illustrated in FIG. 5, a first additional layer 31 may be formed on an outer surface of the cushion 11 by core-back molding, and a second additional layer 32 may be formed on an outer surface of the skin 12 by core-back molding. Thus, the thickness of each of the cushion 11 and the skin 12 may be increased.

Figure 7:
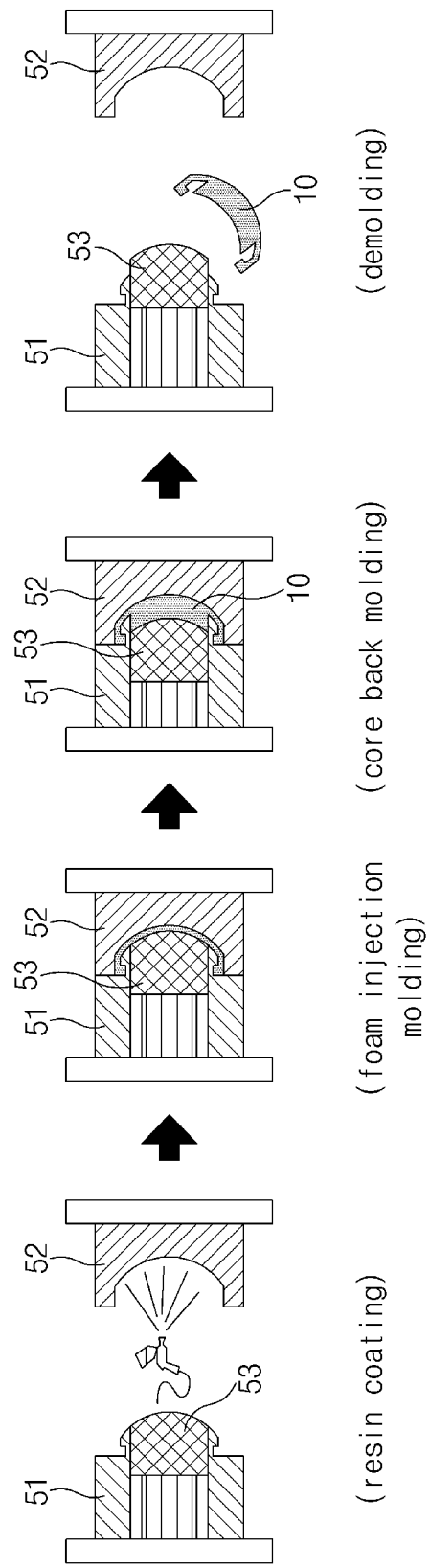
FIG. 7 illustrates a process of manufacturing a vehicle door armrest according to an exemplary form of the present disclosure by a foam injection molding machine.

FIG. 7 illustrates a process of manufacturing a vehicle door armrest according to an exemplary form of the present disclosure by a foam injection molding machine.

Referring to FIG. 7, the foam injection molding machine may include a first mold 51 and a second mold 52. The first mold 51 may be fixed to a base, and the second mold 52 may be mounted to be movable relative to the first mold 51. The first mold 51 may have a core-back mold 53 which is movable therein. The first mold 51 and the second mold 52 may define a plurality of cavities corresponding to the cushion 11, the skin 12, and the living hinge 18 of the door armrest 10. The cushion 11, the skin 12, and the living hinge 18 may be individually formed to have different structures by the cavities of different structures defined by the first mold 51 and the second mold 52. In particular, the shapes, thicknesses, and the like of the cushion 11 and the skin 12 may be individually adjusted by the cavities defined differently by the first mold 51 and the second mold 52.

As illustrated in FIG. 7, in a state in which the first mold 51 and the second mold 52 are opened, an outer surface of the first mold 51, an outer surface of the second mold 52, and an outer surface of the core-back mold 53 may be coated with a molten resin such as PVC by spraying or the like. Thereafter, in a state in which the first mold 51 and the second mold 52 are closed, the molten resin such as PVC may be injected into the cavities between the first mold 51 and the second mold 52 to perform foam injection molding.

Then, core-back molding may be performed by reversing the core-back mold 53. After the core-back molding is completed, the door armrest 10 may be demolded.

A door armrest according to the related art may include a core formed by injection molding, an elastic foam pad made of polyurethane or the like, and a flexible leather skin covering the elastic foam pad. The elastic foam pad may be coupled to the core, and the leather skin may be bonded to an outer surface of the elastic foam pad. In detail, after the core and the outer surface of the elastic foam pad are coated with a bond and the coated bond is dried, the core and the elastic foam pad may be inserted into a mold. After the leather skin is preheated, the leather skin may be inserted into the mold. Then, the leather skin may be bonded to the outer surface of the elastic foam pad by vacuum molding, and the door armrest to which the leather skin is bonded may be demolded. Finally, the door armrest to which the leather skin is bonded may be formed by finishing edges of the leather skin. In other words, the door armrest according to the related art may require bonding the leather skin to the elastic foam pad in a very complex process, leading to increased manufacturing cost. In addition, the assembly of the door armrest may be very cumbersome as the door armrest has to be welded to a door trim body.

On the other hand, the door armrest 10 according to exemplary forms of the present disclosure may be manufactured by forming the cushion 11 and the skin 12 connected through the living hinge 18 as the unitary one-piece structure by one foam injection molding, which greatly simplifies the manufacturing process thereof, and significantly reduces the manufacturing cost. As the skin 12 is folded to the cushion 11 through the living hinge 18, the door armrest 10 may be easily made without any additional finishing, and as the first and second mounting projections 13 and 15 are fitted into the door trim 5, the door armrest 10 may be easily assembled to the door trim 5.

As set forth above, according to exemplary forms of the present disclosure, as the cushion and the skin connected through the living hinge are formed as the unitary one-piece structure by one foam injection molding, the manufacturing process may be significantly simplified, and thus the manufacturing cost may be significantly reduced. As the skin is folded to the cushion through the living hinge, the door armrest may be easily made without any additional finishing, and as the first and second mounting projections of the door armrest are fitted into the door trim, the door armrest may be easily assembled to the door trim.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door armrest, comprising:
a cushion;
a skin covering the cushion; and
a living hinge connecting the cushion and the skin,
wherein the skin is integrally connected to the cushion through the living hinge so that the skin, the cushion, and the living hinge are configured to form a unitary one-piece structure.

2. The vehicle door armrest according to claim 1, wherein the cushion has a plurality of ridge portions and a plurality of valley portions which are continuously connected to each other.

3. The vehicle door armrest according to claim 1, wherein the skin includes a cover portion covering a top of the cushion, and edge walls covering edges of the cushion.

4. The vehicle door armrest according to claim 3, wherein the edge walls include a first edge wall facing an interior space of a vehicle, and a second edge wall facing an exterior space of the vehicle.

5. The vehicle door armrest according to claim 1, wherein:
the cushion has a plurality of first mounting projections extending toward an exterior space of a vehicle,
the skin has a plurality of second mounting projections extending toward the exterior space of the vehicle, and
as the skin is folded over the cushion to overlap each other, second mounting projections of the plurality of second mounting projections are aligned with and overlap corresponding first mounting projections among the plurality of first mounting projections.

6. The vehicle door armrest according to claim 1, wherein the cushion has first pores formed therein.

7. The vehicle door armrest according to claim 6, wherein the first pores are closed pores.

8. The vehicle door armrest according to claim 1, wherein the skin has second pores formed therein.

9. The vehicle door armrest according to claim 8, wherein the second pores are closed pores.

10. The vehicle door armrest according to claim 1, wherein:
the cushion has a plurality of ridge portions and a plurality of valley portions, which are continuously connected to each other to form a wave form and configured to primarily absorb a load applied on the vehicle door armrest, and
a plurality of pores formed in the plurality of ridge portions is configured to secondarily absorb the load applied on the vehicle door armrest.

* * * * *